Aug. 27, 1957  E. PERSSON ET AL  2,804,302
MAIL HANDLING TABLES
Filed May 17, 1954  10 Sheets-Sheet 1

INVENTORS
MILLARD L. BEYER
BY ERNEST PERSSON
James N. Curtin
ATTORNEY

Aug. 27, 1957 — E. PERSSON ET AL — 2,804,302
MAIL HANDLING TABLES
Filed May 17, 1954 — 10 Sheets-Sheet 2

INVENTORS
MILLARD L. BEYER
ERNEST PERSSON
BY James N. Curtin
ATTORNEY

Aug. 27, 1957  E. PERSSON ET AL  2,804,302
MAIL HANDLING TABLES

Filed May 17, 1954  10 Sheets-Sheet 4

INVENTORS
MILLARD L. BEYER
ERNEST PERSSON
BY James N. Curtin
ATTORNEY

Aug. 27, 1957  E. PERSSON ET AL  2,804,302
MAIL HANDLING TABLES

Filed May 17, 1954  10 Sheets-Sheet 8

INVENTORS
MILLARD L. BEYER
ERNEST PERSSON
BY James N. Curtin
ATTORNEY.

INVENTORS
MILLARD L. BEYER
ERNEST PERSSON
ATTORNEY.

Aug. 27, 1957

E. PERSSON ET AL 2,804,302

MAIL HANDLING TABLES

Filed May 17, 1954

INVENTORS
MILLARD L. BEYER
ERNEST PERSSON
BY
*James N. Curtin*
ATTORNEY.

2,804,302

MAIL HANDLING TABLES

Ernest Persson, New York, and Millard L. Beyer,
Hempstead, N. Y.

Application May 17, 1954, Serial No. 430,054

17 Claims. (Cl. 271—45)

This invention relates to mail handling tables of the kind known as facing or sorting tables provided with conveyor belts running along the table to carry to the end of the table envelopes usually arranged on the belts edgewise with thin stamps on the lower front surface adjacent their leading edges.

In some instances mail sorting tables are used to feed directly from two conveyor belts or troughs a dual cancelling and stacking mechanism, one part being used for long envelopes and the other for short envelopes. With the constantly increasing volume of air mail it has become desirable to sort and face the air mail at the sorting table and then cancel it separately in order to expedite the same instead of subsequently inspecting the cancelled and stacked envelopes and removing the air mail therefrom for separate handling. This is an expensive and time-consuming process. Accordingly, an object of the invention is the provision of a third flat conveyor belt on the sorting table and an individual cancelling and stacking apparatus therefor which may be used exclusively for air mail.

The Post Office Department has been making great efforts to reduce the cost of handling mail and thereby the annual deficit for this department. Consequently, the mail handling tables of the present invention, in order to be acceptable, must be produced at low cost and so designed as to reduce the cost of labor handling mail. Accordingly, the mail handling tables are designed with individual stacker baskets arranged side by side so that even with rapid operation of the equipment, the baskets can be emptied quickly by one man. Furthermore, the side by side arrangement of the stacker baskets makes it possible to place the facing tables closer together, saving floor space, since there is no need for the person emptying the baskets to pass between the tables.

As an economy measure, the invention makes use of known, formerly hand fed, combined concelling and stacking machines, which may be coupled up by means of a simple adapter structure of novel design to a facing table provided with three flat belts, the adapter unit serving automatically to feed, in the present instance, three cancelling and stacking machines, thereby eliminating the personnel formerly required to take the faced letters from the sorting table and feed the envelopes manually to the respective cancelling and sorting machines. With the automatic adapter feed, the capacity of each of the cancelling machines has been increased from approximately 700 envelopes per minute, with manual feed, to over 1000 per minute by the elimination of lost time incurred in hand feeding.

In order to avoid expensive re-tooling, the adapter unit is designed as a separate attachable mechanism which makes possible automatic operation for a certain cancelling and stacking machine now being used in quantities by the Post Office Department. This machine is of durable and reliable construction and its operation and maintenance is well known to Post Office employees. Accordingly, a further object of the invention is the provision of an adapter unit for operating automatically a group of normally manually operated cancelling and stacking machines, without any substantial alteration of the individual cancelling and stacking units per se.

A further object of the invention is the provision of a non-jamming high speed belt arrangement for the sorting and facing table, which virtually eliminates jamming and clogging of the envelopes upon the flat conveyor belts of the table and at the same time effectively spreads out on the flat conveyor belt bunches of envelopes so that they are fed uniformly to the cancelling mechanism separator rollers at a fairly uniform rate rather than in an irregular series of groups of bunched envelopes as is the case when a single flat belt is relied upon to transport the envelopes along the sorting table toward the cancelling apparatus.

The invention will now be described with the aid of the accompanying drawing wherein—

Figs. 1, 2, 4, 5, 6, 7 and 8, taken together, show three cancelling and stacking units normally manually fed but, when arranged in the illustrated manner, may be fed automatically from a three channel sorting table.

Figs. 11 and 12 show very schematically variable speed devices for controlling the respective belts.

The invention will now be described with the aid of the accompanying drawings. Only a portion of the facing or sorting table is shown since the table is generally similar to that shown in U. S. Patent No. 2,738,051, granted March 13, 1956.

Figure 3:
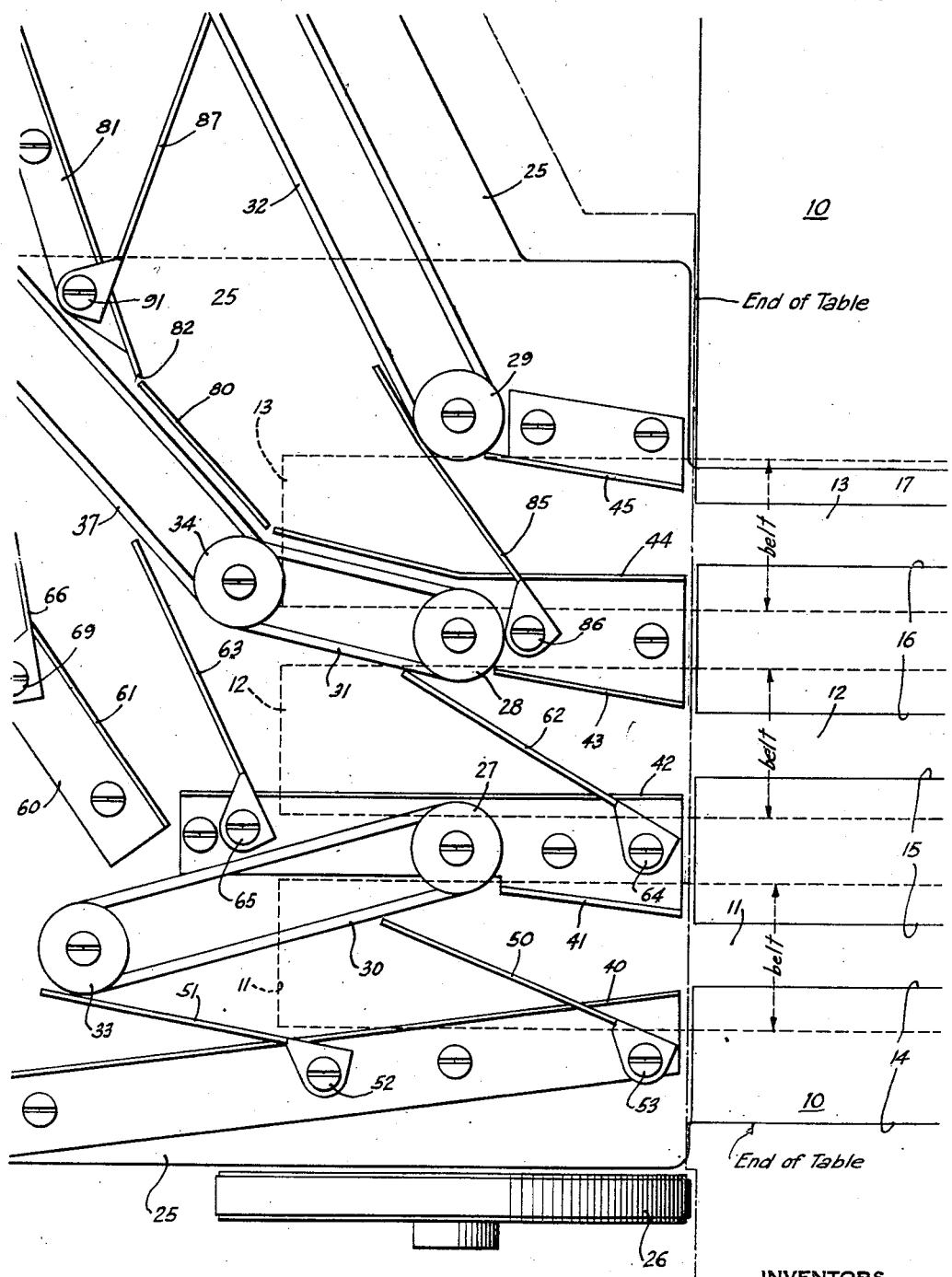
Fig. 3 shows a plan view of a novel adaptor unit for interconnecting a sorting table with a plurality of cancelling and stacking devices.

Referring to Fig. 3, a portion of the end and front of a sorting table 10 is shown at the right hand side of the drawing. Table 10, in the embodiment shown in Fig. 3, is provided with three flat conveyor belts 11, 12 and 13 which extend beyond the end of table 10 as indicated by dotted lines. The belts are supported, preferably by rollers, not shown, which may be attached by any suitable means, such as extension brackets, to the table structure 10.

Associated with each flat belt 11, 12 and 13 are generally vertical sides or guides 14, 15, 16 and 17 sufficiently high to support an envelope so that the lower edge of the envelope rides on one of the flat belts and is carried along thereby, slanting variably toward approximately vertical position, the arrangement just described being similar to three rather closely disposed, parallel troughs of which the belts 11–13 form the bottoms.

According to usual practice, the belt 11 would be used for long envelopes and belt 12 for short envelopes. The present invention provides a third belt 13 which may be used for air mail.

The closely spaced flat parallel belts of the table lead respectively into three diverging envelope conveying channels of an adaptor unit, which convey the envelopes from the flat belts of the table into chutes of individual cancelling and stacking machines.

The reason for providing a diverging channel arrangement in the adaptor unit is that the envelope input troughs of the three cancelling and stacking units, to be described, when the units are arranged side by side are much more widely separated than the flat conveyor belts of the sorting belts so that the adaptor unit must provide three diverging envelope conveyors which connect the conveyor belts of the table with corresponding ones of the cancelling and stacking units.

It is contemplated that the adaptor unit be an independent unit adapted preferably to be attached to the sorting table and provided with an independent drive for the various belts and rollers thereon. The adaptor unit may be provided with suitable legs, not shown. With this arrangement the unit may be readily assembled with a sorting table or detached therefrom without making mechanical changes in the sorting table. The cancelling and stacking units, which will be described, are also provided with individual driving motors, for the reason of initial economy, and when desired, any or all of the stacking units may be moved to other locations for other operating conditions, such as manual feed. The arrangement described also permits any of the above-mentioned components to be replaced readily should trouble develop in a particular unit.

It is not thought necessary to describe in detail the various shafts and the driving means for the adaptor unit, beyond mentioning that all the parts of the unit are of heavy substantial construction, and designed according to known mechanical engineering practice so that the parts operate at high speed substantially without vibration. Therefore it is thought that a description of the plan view of the adaptor unit shown herein will provide an adequate understanding thereof.

Figure 5:
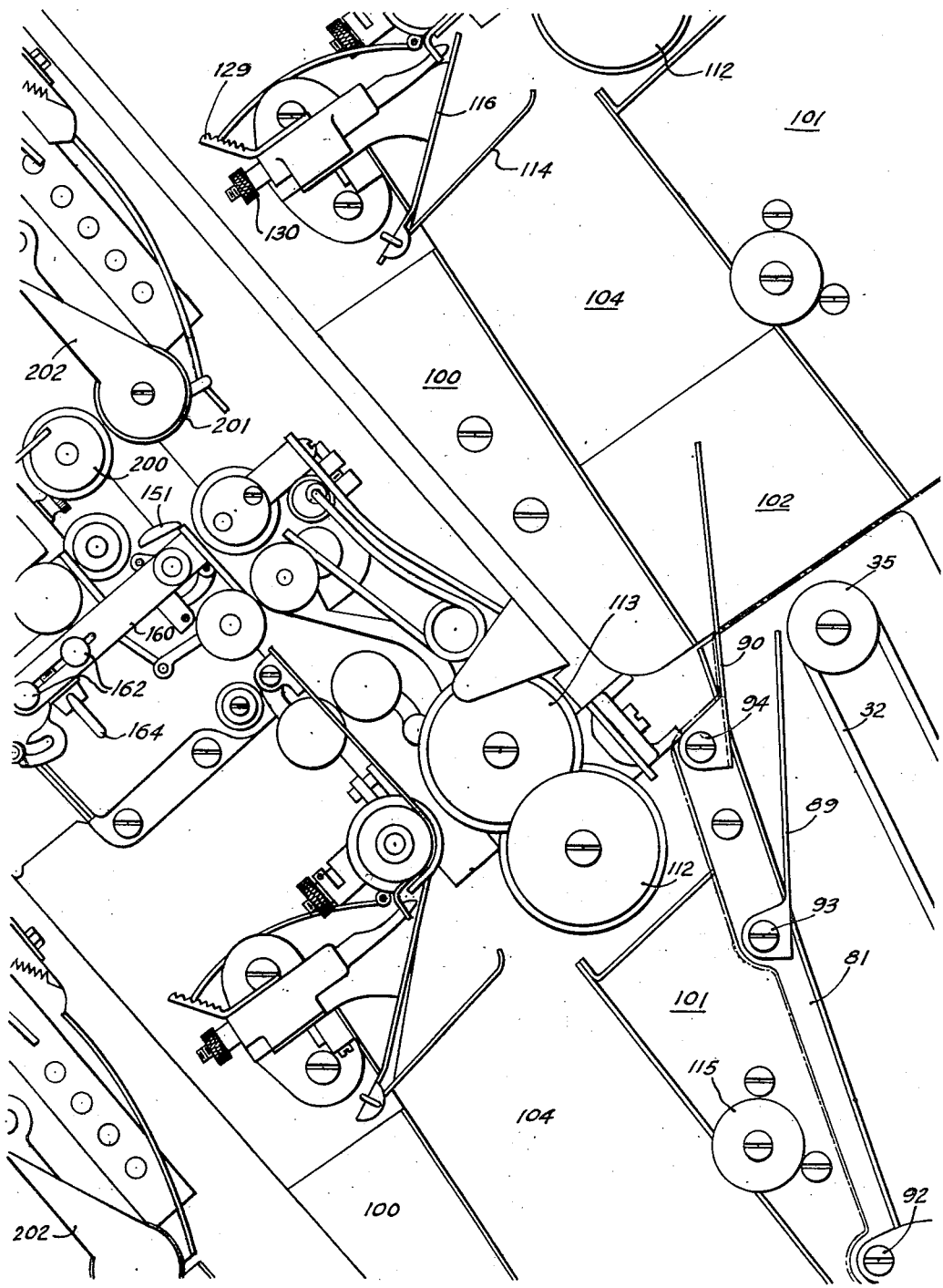
Figure 6:
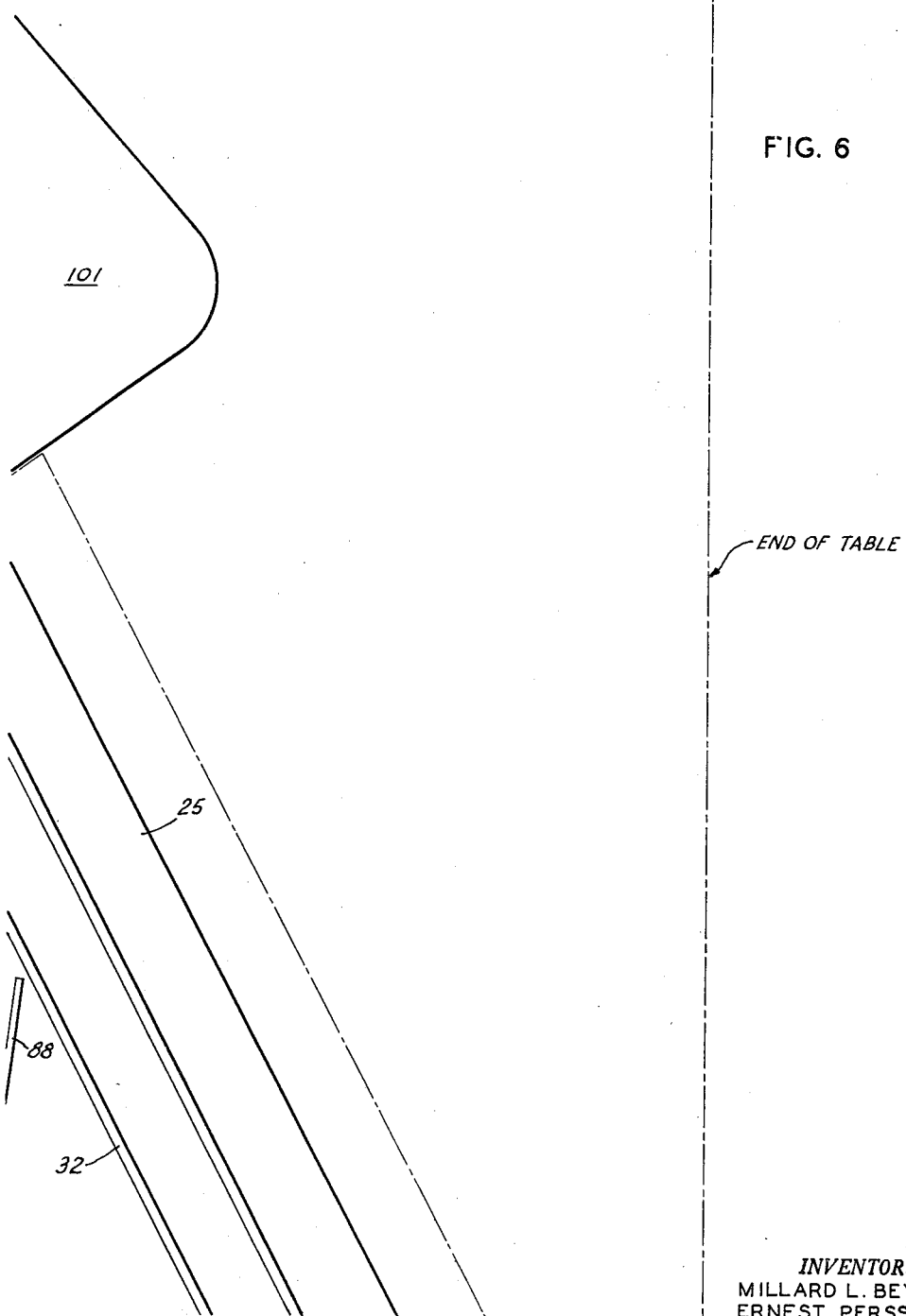

The adaptor unit comprises a series of belts, rollers, pulleys and guide members all mounted on the top surface of an irregularly shaped flat plate 25 bounded by dot-dash lines for easy identification and shown principally in Fig. 3 which also shows the relative arrangement of the three flat conveyor belts of the sorting table and the three diverging channels for the output of these belts. Other boundary portions of the adaptor unit are shown in Figs. 2, 5 and 6.

Referring to Fig. 3, a driven pulley 26 mounted on the adaptor unit is used to drive through conventional means, not shown, pulleys 27, 28 and 29, associated respectively with the outputs of sorting table conveyor belts 11, 12 and 13. The pulleys just mentioned are quite wide and drive belts 30, 31 and 32 are of soft rubber and about half the width of a standard envelope. The belts turn about idler pulleys 33, 34 and 35, the latter pulley being shown on Fig. 5, while an intermediate portion of belt 32, which is quite long, is shown on Fig. 6.

Figure 2:
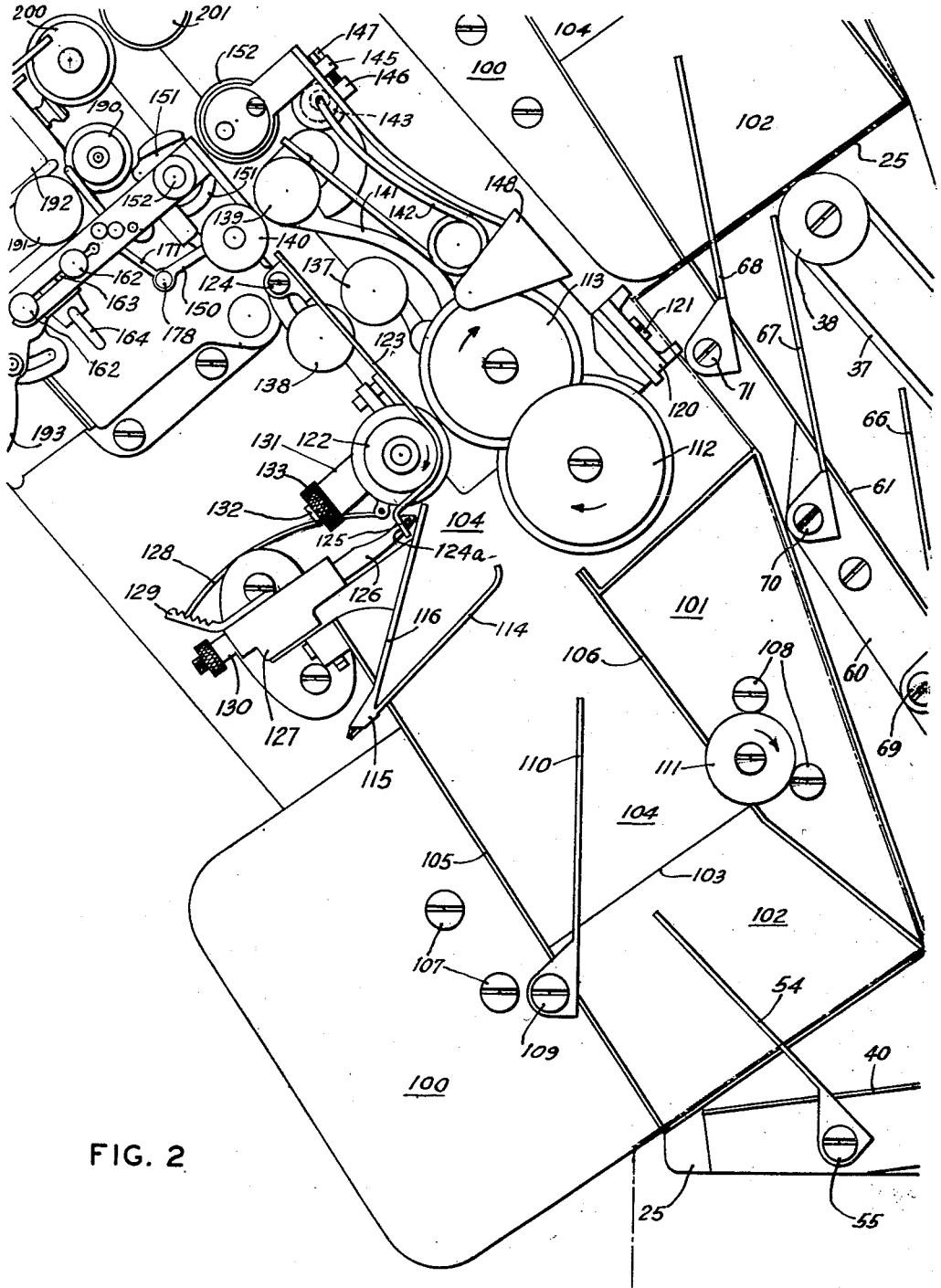

Referring to Fig. 3, pulley 34 driven by belt 31 in turn drives a belt 37 looped about idler pulley 38, Fig. 2, which is associated with the middle envelope conveying channel.

To continue the channels or troughs formed by the members 14, 15, 16 and 17 of the sorting table, guides 40, 41, 42, 43, 44 and 45 are mounted by screws in spaced relation on top plate 25 of the adaptor unit. As shown in Fig. 3 of the drawings by dotted lines, the associated pair of guides of those just named flare away from each other, funnel fashion. The guides are formed of angle pieces, each having a vertical envelope guide flange, or in the case of 41—42 and 43—44 two vertical flanges of substantial height, about the width of a standard envelope. Due to the change in direction occasioned by divergence of the respective envelope channels, no two of the above-mentioned guides are of the same shape but it is thought the structure may be readily understood from Fig. 3 of the drawings. The adaptor guides 40–45 overlie corresponding edge portions of the sections of sorting table belts 11, 12 and 13 which extend beyond the end of table 10 and this arrangement provides a positive method for injecting envelopes carried by the flat conveyor belts of the sorting table to positions where the envelopes in the respective channels of the adaptor unit are carried along by the belts associated with these channels.

Belts 30, 31, 32 and 37 form portions of one side of the envelope conveying troughs of the adaptor unit and the opposite side of each trough is formed by angle pieces. Each of the angle pieces just mentioned carries one or more spring loaded pressure arms of substantial width, approximating half the width of a standard size envelope. For example, pressure arms 50 and 51 are pivoted on rather long bearing screws 52 and 53 to the front guide plate 40. Springs, not shown, in each instance are mounted on the respective bearing screws and exert a light, positive pressure on the associated pressure arm tending to bias the arm in a clockwise direction. The pressure arms extend through slots formed in the vertical side of the guide plate so positioned and of such dimensions as to permit maximum rotation of the pressure arms in a counterclockwise direction. The right hand edges of the respective slots just mentioned are positioned to act as stops for the associated pressure arms to arrest the clockwise rotation of the pressure arm under influence of its spring to prevent the end portions of the pressure arm from actually engaging the associated belt, to prevent unnecessary wear on the latter. The various pressure arms are shown in Figs. 2 and 3 in their position of rest, such as occurs when no envelopes are being fed through the machine. The various pressure arms are spaced from each other somewhat less than the length of a standard envelope. That is, before the envelope leaves one conveying or propelling means, its leading edge portion will come under the propelling influence of the next unit. For example, belt 11 of the front channel conveys the envelopes thereon until the leading edges of the envelopes are well beyond the end of pressure arm 50 which cooperates with belt 30 to urge the envelopes into engagement with the belt which propels them forwardly after they have passed beyond the end of the flat conveyor belt 11 of the sorting table 10. Before the envelopes have passed beyond the end of arm 50, the envelopes deflect pressure arm 51 in the same manner, urging the envelopes into contact with belt 30 just where the belt turns about idler pulley 33.

In addition to pressure arms 50 and 51, guide plate 40 carries a third similar pressure arm 54 pivoted thereto on pivot screw 55. The end portion of arm 54 extends beyond plate 25 of the adaptor unit and over the horizontal chute plate of the front cancelling and stacking unit, to be described, for the purpose of preventing either single envelopes or envelopes in small groups from failing too much toward one side when passing through the chute to the conveying means of the cancelling and sorting unit.

The middle flat conveyor belt 12 of the sorting table is coupled in the manner just described with the feeding mechanism of the adaptor unit. But in this instance, the output of the middle adaptor conveying belt must be very widely spaced from the output of the front conveyor belt as compared with the spacing of the flat conveyor belts 11 and 12 of the sorting table. Therefore, the middle channel of the adaptor unit is modified and led off in an angular direction from belt 12 to provide the required spacing of the respective outputs.

The middle channel has a guideway with sides flaring out from belt 12, one side of the channel being formed by a first section comprising the vertical member 42 of an angle piece fastened to base plate 25 by screws and a second section comprising an angle piece 60 (Figs. 2 and 3) having a vertically disposed plate 61. Angle piece 60 is disposed on plate 25 at a considerable angle with respect to the position of the first portion of the guideway 42 to provide the desired increased spacing between the outputs of the front channel and the middle channel now being described. The opposite side of the middle channel is formed by the vertical portion of a short angle piece 43 together with belts 31 and 37 already described. The sides of the middle channel flare away from each other as far as the end of the vertical side 42 of the angle piece. The latter has two pressure arms 62 and 63 mounted thereon on pivot screws 64 and 65, respectively. Guideway angle piece 60 has three pressure arms 66, 67, and 68 mounted thereon on pivot screws 69, 70 and 71, as shown in Fig. 2. The structure and operation of the pressure arms just mentioned is similar to that of pressure arms 50 and 51 already described. Pressure arm 62 cooperates with belt 31 while pressure arms 63, 66 and 67 cooperate with belt 37. Pressure arm 68 is disposed with its end portion extending beyond top plate 25 of the adaptor unit so as to overlie the base of the throat of the middle cancelling and stacking device, to be described, the pressure arm functioning in the same manner as pressure arm 54 already described.

The rear or innermost flat conveyor belt 13 of the sorting table feeds envelopes into a conveying apparatus of the adaptor unit at a much greater angle than those of the corresponding units already described to provide for the greater offset position of the rear cancelling and stacking unit, to be described. It will be seen from the drawings that the length of the channels of the adaptor unit increases progressively from front to rear.

As in the two conveying systems associated with the flat conveyor belts 11 and 12 of the sorting table, the rear belt 13 thereof feeds envelopes into a guideway formed with sides composed of belts and angle pieces which sides flare away from each other near the entrance portion considerably to permit re-orientation of the envelopes as the course of the adaptor unit changes its direction. Belt 13 also in this instance conveys the envelopes until they are under control of the advancing mechanism of the adaptor unit.

The lower side of the rear conveyor is formed by an angle piece which has a vertical guide portion 44. The angle piece is fastened to the top plate 25 of the adaptor unit by screws and is bent slightly away from the first two channels of the adaptor unit. The angle piece has its vertical wall 44 aligned with the wall 80 (Figs. 3, 5 and 6) of a second angle piece 81 fastened to the flat plate of the adaptor by screws. Wall 80 is shown as being bent at 82 in such direction as to divert the path of the rear channel further toward the rear to provide adequate spacing between the outputs of the three conveyor channels of the adaptor unit.

As in the previous cases just described, the angle pieces which comprise the lower side of the inner guideway carry one or more pressure arms which are spring loaded and are pivoted thereto. They function and are constructed in the same manner as pressure levers 50 and 51 already described.

Angle piece 43—44 has a single pressure arm 85 pivoted at 86, the free end portion of the pressure arm cooperating just beyond the point where belt 13 is effective, near pulley 29 with belt 32, already described. Pressure arms 87, 88, 89 and 90 are pivoted to angle piece 81 respectively by pivots 91, 92, 93 and 94. Of the latter, pressure arms 87, 88 and 89 cooperate with belt 32, while pressure arm 90 is disposed with its end portion extending beyond the adaptor plate and projecting part way into the throat of the rear cancelling and stacking machine, as will be described.

The cancelling and stacking machines now about to be described are of heavy construction. Each is mounted on a heavy cast iron pedestal and each has an individual motor. In other words, each is an independent unit primarily adapted for manual feeding and any or all of the cancelling and stacking units may be moved away from the assembly described herein and used as an independent machine should the need arise. These units are unmodified except for some reshaping of flat plates on either side of their input chutes, which does not interfere with their operation as single manually fed units. The plates involved are provided only for convenience of the operators and may be readily transposed or replaced with standard plates since each plate is held in position by but two flat head screws. The mechanism of the unit is very heavy, considering the light envelopes handled, to give long wear and the structure is practically vibrationless, requiring no bolting to the floor even when operated at high speed.

The present invention is designed to provide an automatic feed for three cancelling and stacking units of this type to make use of durable manually fed machines which have been tested for years and for which spare parts or complete replacements are available. Furthermore the operation and maintenance of the units is well understood by post office personnel all over the country. A further object of the invention is to provide an automatic feed for a plurality of such known units in order to save many thousands of dollars for the Post Office Department, which would be lost if it were found necessary to declare the present single units obsolete due to manual operation and the difficulty of feeding a plurality of such machines from a single group of three associated belts on a sorting table. Still another object of the invention is to provide an efficient, durable multiple cancelling and stacking arrangement using, generally, old susbtantially unmodified manually operated equipment to save costly redesign, retooling and manufacturing expenses for the Post Office Department. Still another feature of the arrangement disclosed herein is the provision of an automatic feeding system for a series of independent stacking devices in which the stacking baskets are all arranged side by side in symmetrical slantwise relation at the end of the processing apparatus which eliminates the necessity of the attendant who empties the baskets to pass between different tables and in general permits the more speedy emptying of each group of three associated stacker baskets.

The cancelling and stacking units will now be described with reference to the plan view of the same, composed of several figures of drawing. It will be understood that conventional mechanisms will be used for driving the various rollers, belts and other moving parts of the respective cancelling and stacker units, so these elements are omitted as being unnecessary to this disclosure.

Figure 1:
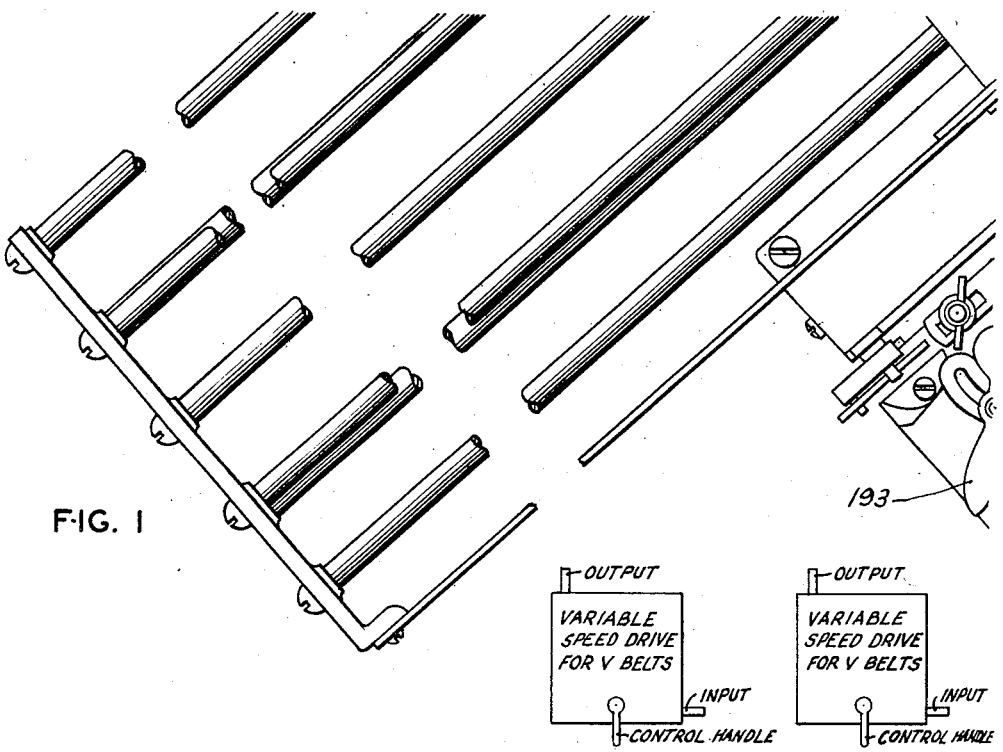
Figure 14:
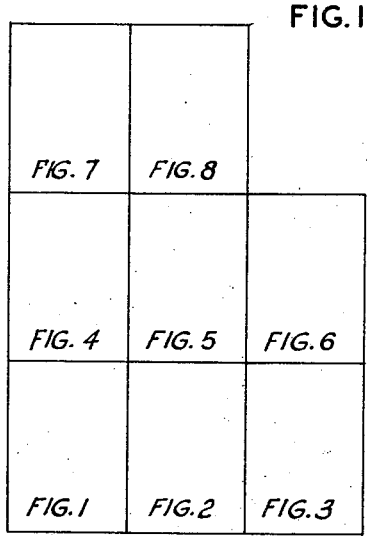
Fig. 14 is a diagram showing the arrangement of the above mentioned figures, minus their margins, to form a single complete plane view of a unitary structure assembled from envelope feeding mechanisms and three cancelling and stocking units arranged in accordance with the present invention.
Figure 4:
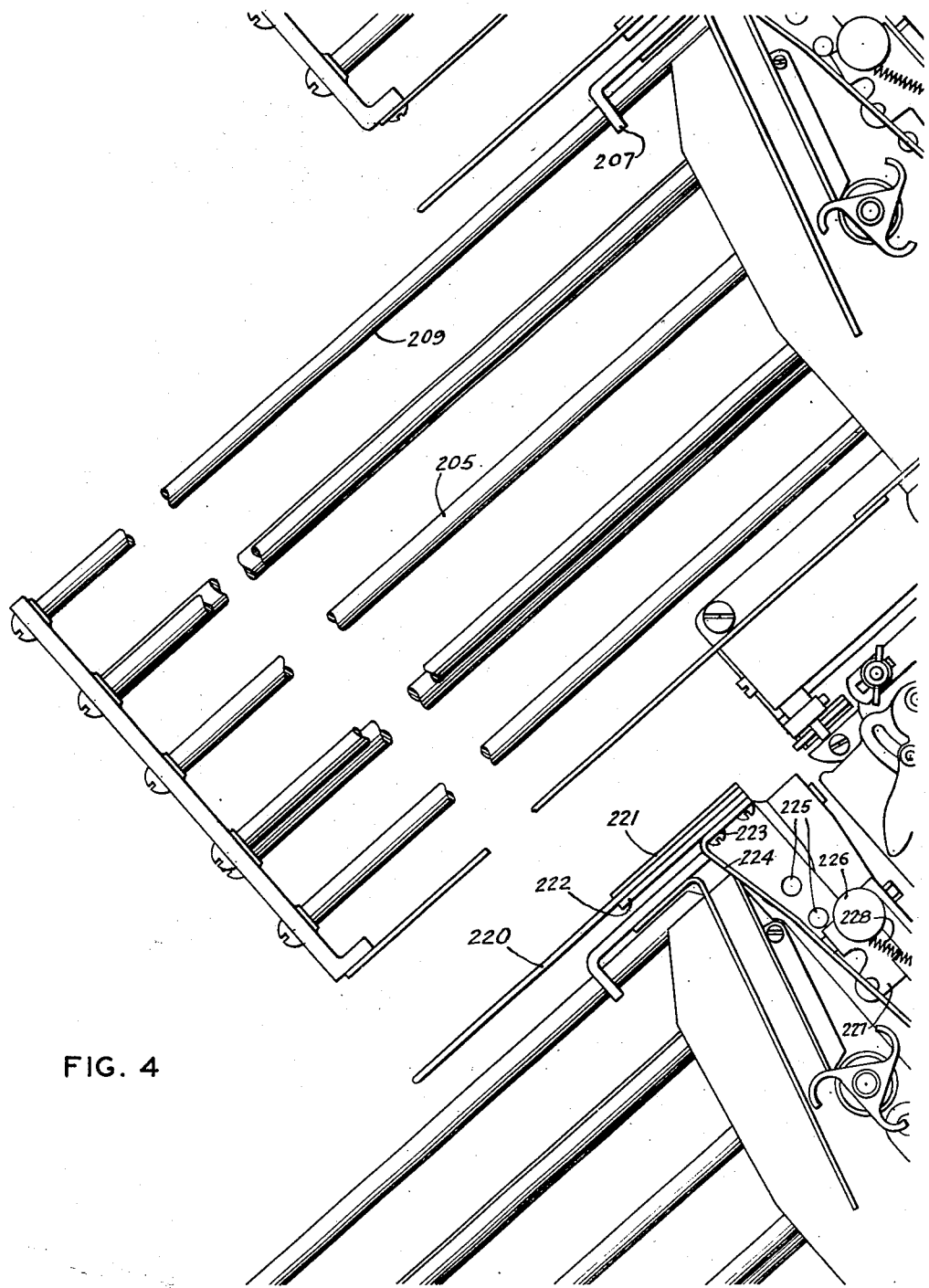

The plan view of the front cancelling and stacking unit which processes the mail from the front flat conveyor belt 11 is shown in Figs. 1, 2 and the lower part of Fig. 4.

All of the parts referred to are supported by a heavy cast iron pedestal, not shown, which operates at its maximum speed without vibration and once placed in position will stay immovably during use without securing the base of the pedestal to the floor.

As previously stated, the free end portion of pressure arm 54 extends beyond the adaptor unit for belt 11 into the input chute of the front cancelling and stacking unit dividing the input part of the chute into two parts, the one receiving the envelopes being somewhat less in width at its widest portion than half the length of a conventional envelope.

The chute is formed of three plates 100, 101 and 102. The latter is a short base plate at the entrance thereof. Beyond the innermost end 103 of the base plate is a wide flat belt 104 driven by the driving mechanism of the cancelling and stacking unit, not shown. As is usual, belt 104 is wider and runs under the guideways, about to be described, and extends effectively almost up to an envelope separating and feeding roller system which will be described later on.

The chute, in addition to base plate 102 is provided on opposite sides with high vertical guides, approximately the width of the conventional envelope formed by vertical upwardly bent sections 105 and 106 of the flat horizontal plates 100 and 102. It will be noted that the latter are secured respectively to the machine framework by readily accessible pairs of flathead screws 107 and 108, which arrangement is followed in all three cancelling and stacking units although there have been slight modifications in the contour of plates 100 and 101 for space saving reasons. Plate 100 differs from the corresponding plates of the remaining unit in that it carries on a pivot screw a pressure arm 110 similar in construction to those already described and used to maintain single envelopes or small groups of envelopes riding on belt 104 on their lower edges during their brief trip on this short belt.

A high, rubber tired driven roller 111 having a side portion extending partway through the chute guide 106 near the beginning of flat belt 104 aids in advancing the envelopes along the chute.

During the short distance between driven feed roller 112 and the left hand end 103 of the chute 102 flat conveyor belt 104 urges the envelopes forward toward feed roller 112 which revolves at higher speed than the rest of the feeding members and is provided with a soft rubber tire about one half inch wide at its lower portion only. Adjacent feed roller 112 is a feed roller 113 provided with a rubber tire about three-fourths of an inch wide which is disposed above the rubber tire of roller 112 and revolves clear of roller 112, its tire, and upper flange.

A wide, lightly spring loaded arm 114 tends to deflect the envelopes from the chute in the direction of feed wheels 112 and 113. Arm 114 is pivoted at 115 in a fixture attached to a wide, fixed, slanting plate 116. Feed wheels 112 and 113 which have the same diameter are mounted on suitable spindles or shafts to feed roller stand 120. This stand is adjustable, backwards or forwards by a large screw 121.

Feed roller 113 cooperates with a separator roller 122 having a spindle driven in a direction which is the reverse of that of feed roller 113. The separator roller 122 has a rubber tire of considerably smaller width than that of feed roller 113 so as to exert less friction on the surface of the envelopes coming into contact therewith. The separator roller is provided with an adjustable J-shaped guard 123 slotted at the curved portion of the J sufficiently to permit a small arc of the separator roller to project therethrough in the direction of feed roller 113. The guard is secured to the frame at its long end by shoulder screw 124. The opposite end of the guard 123 has an angle piece 124a fastened thereto. Against the free edge of angle piece 124a a pin 125 attached to an adjusting slide 126 rests. The adjusting slide 126 is slidably supported by bracket 127, attached to the frame of the machine. A flat spring 128 having one end adjustably disposed in any of a series of notches formed in a member 129 attached to bracket 127 for the purpose of varying its tension has its opposite end secured in a fixture attached to separator wheel guard 123 for the purpose of keeping the parts of the guard and the connection between the guard and adjusting slide 126 in snug tensioned contact. Adjusting slide 126 may be moved backwards or forwards to change the amount of the separator wheel protruding through the slot in the guard 123 by turning one way or another the thumbscrew 130 threaded onto the opposite end of slide 126.

Separator roller 122 which is rubber tired, is driven through a suitable universal joint, not shown. The lower part of the separator roller including the shaft is mounted in a movable fixture including bracket 131. A threaded member 132 extends through the bracket and knurled screw 133 thereon may be adjusted to produce a desired spacing, which of course is quite narrow, between the peripheries of feed roller 113 and separator roller 122 which cooperates directly therewith in the known manner to feed envelopes one at a time either singly or from groups of envelopes one at a time toward the cancelling die through suitable feeding mechanism, now about to be described.

After the individual envelopes pass between the separator rollers, they are engaged by a pair of driven pressure rollers 137 and 138 provided with rubber tires, which feed the individual envelopes in the direction of the cancelling apparatus which is provided with a pair of input feed rollers of somewhat different construction to provide space for a trip trigger of the cancelling apparatus, to be described, which must extend into the path of the envelopes. Referring to Fig. 2, cooperating pressure rollers 139 and 140 are the input to the cancelling apparatus. Rollers 139 is pivoted to one end of a long arm 141 the opposite end of which and the pivotal mounting therefor is hidden by being mounted below pressure roller 113. A long, heavy spring 142 tensions roller 139 against its cooperating driven roller 140. One end of spring 142 rides and thereby exerts pressure on a bracket which supports two spaced steel rollers 139 on a common shaft. The opposite end of spring 142 is bent downward, and the latter portion extends downward into a hole eccentrically formed in a roller 143 which is held in a split clamp support provided with outwardly extending lugs 145 and 146. A screw 147 extends through the lugs and when tightened will lock roller and also spring 142 in a fixed position. Spring 142 is very heavy and it takes but a small change in the angular position of roller 143 to make a noticeable change in the tension exerted on roller 139.

Roller 140 is provided with spaced rubber tires corresponding to the spaced arrangement of its cooperating two element roller 139 to permit free operation of a trip tongue lever between the spaced roller elements which initiates each operation of the cancelling machine which will be described shortly.

An approximately triangular plate 148 extending part way over feed roller 113 is a guard to protect the fingers of the attendants.

Figure 9:
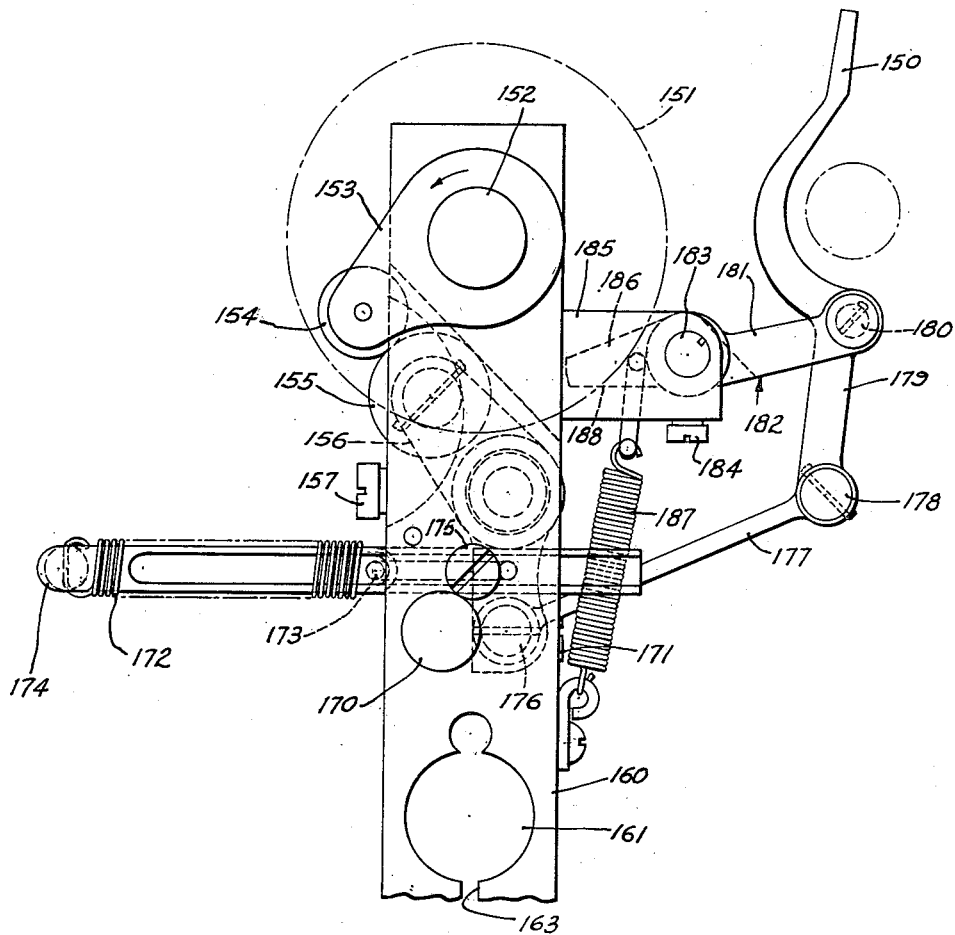
Fig. 9 shows in enlarged plan view of the envelope operated trip device which controls the respective cancelling machines.

Referring to Fig. 9 a trip tongue 150 extends between the spaced rubber tires of feed roller 140 to the left of the shaft for the roller, the end of the trip tongue lever extending across the path of the envelopes so as to be turned on its fulcrum by the leading edges of the respective envelopes as they are fed toward the cancelling mechanism. The trip tongue, when actuated, releases a normally stopped printing die 151 bearing the cancelling indicia, which is mounted as a unit on a shaft driven through a suitable clutch, such as a friction clutch, not shown. A stop arm 153 carrying a roller 154, Fig. 9, pivoted in the end thereof, is secured to shaft 152 overlying the die 151. The stop arm roller 154 cooperates with a roller 155 mounted near the end of a stop lever pivoted on stud 157. The arrangement is such that the centers of rollers 154, 155 and stud 157, when in a position of rest, are disposed in a straight line. With this arrangement, when used in conjunction with a linkage of levers about to be described and connected with the opposite end of lever 156, a very light impact by the leading edge of an envelope on the end portion of trip lever 150 will disturb the alignment of rollers 154, 155 and stud 157, releasing roller 154 from roller 155 and also shaft 152 and the die 151 carried thereby. Once released, roller 154 will cam roller 155 out of its path and shaft 152 will be free to turn for one revolution when it will be stopped again by roller 155, irrespective of whether or not the end of trip lever 150 is held deflected momentarily by the passage of an extra long envelope between the die and its platen roller 152, Fig. 2.

The structure just described, including the die, its shaft and start-stop mechanism are supported in a bracket. These parts as well as the bracket may be readily removed from the machine, for substituting a cancelling die with different indicia or for servicing or cleaning. The bracket to which various of these parts are attached comprises a flat bar 160 provided with two round holes 161 which fit over upright rods 162 fastened to the frame of the machine. The end portion of bar 160 which includes holes 161 is slotted at 163. A thumb screw 164, Fig. 2, of large size extends across slot 163 for the purpose of pinching holes 161 tightly about uprights 162 to hold the bracket in operative position or for releasing the same when it is desired to remove it from the machine.

A fibre stop pin 170 for lever 156 having a flattened engaging surface is fastened in an opening in bracket arm 160 by screw 171. Lever 156 is held against stop pin 170 by a spring 172 having one end connected by a link 173 to the lever and the other fastened to the turned over end of spring post 174 adjustably secured in an opening in bracket 160 by screw 175.

Lever 156 is pivoted at 176 to a link 177 which in turn is pivoted on a pin 178 to an arm 179 of trip tongue lever 150. The latter is fulcrumed on a pin 180 held at the end of an arm 181 of a second lever 182 which turns on a fulcrum 183 held by screw 184 in an opening in a slotted block 185 fixed to bracket arm 160. A second arm 186 of lever 182 is in offset relation with respect to arm 181 so that the arms are in rather widely separated planes. Spring 187 normally holds the lower edge 188 of lever arm 186, see Fig. 9, against a portion of the supporting block 185 which serves as a backstop.

When an envelope initially engages trip lever arm 150, it turns the lever on its fulcrum 180 in a counterclockwise direction, as lever 182 is restrained from rotation at this time by the engagement of lever arm surface 188 against its backstop. This rotation of trip tongue lever 150 is communicated to stop lever 156 which is turned initially in a counterclockwise direction by lever 150 and then cammed further in the same direction by roller 154 on the stop arm, once the stop arm 153 and die 151 start to turn. Meantime the envelope is overriding the end of trip tongue lever 150 and the lever is pushed downward turning lever 182 on its fulcrum 183 in a clockwise direction. With this movement of lever 182, stop lever 156 is free to snap back under the influence of its spring 172 and stop roller 154 is again in the path of roller 155, effective to stop the die in advance of a complete rotation of shaft 152 and before the envelope has passed beyond the die 151 and its platen 152. In addition to printing cancelling marks at a uniform distance from the leading edges of the respective envelopes, the arrangement just described definitely insures that the envelopes will be fed to the stacking apparatus, now to be described, one at a time in spaced relation.

Cancelling die 151 is inked by a felt covered roller 190 which is engaged and inked by a steel roller 191. One side of roller 191 fits a vertical slot formed in one side of an ink tank 192. A system of felt rollers, not shown, within the ink tank spread the ink uniformly over roller 191. A lever 193 coupled with a mechanism supporting the ink tank can be used to displace the ink tank to control the amount of ink deposited on felt covered roller 190, or when the machine is not in use to cut off entirely the supply of ink therefor. The inking mechanism per se is not pertinent to the present invention and therefore is only briefly described.

Figure 7:
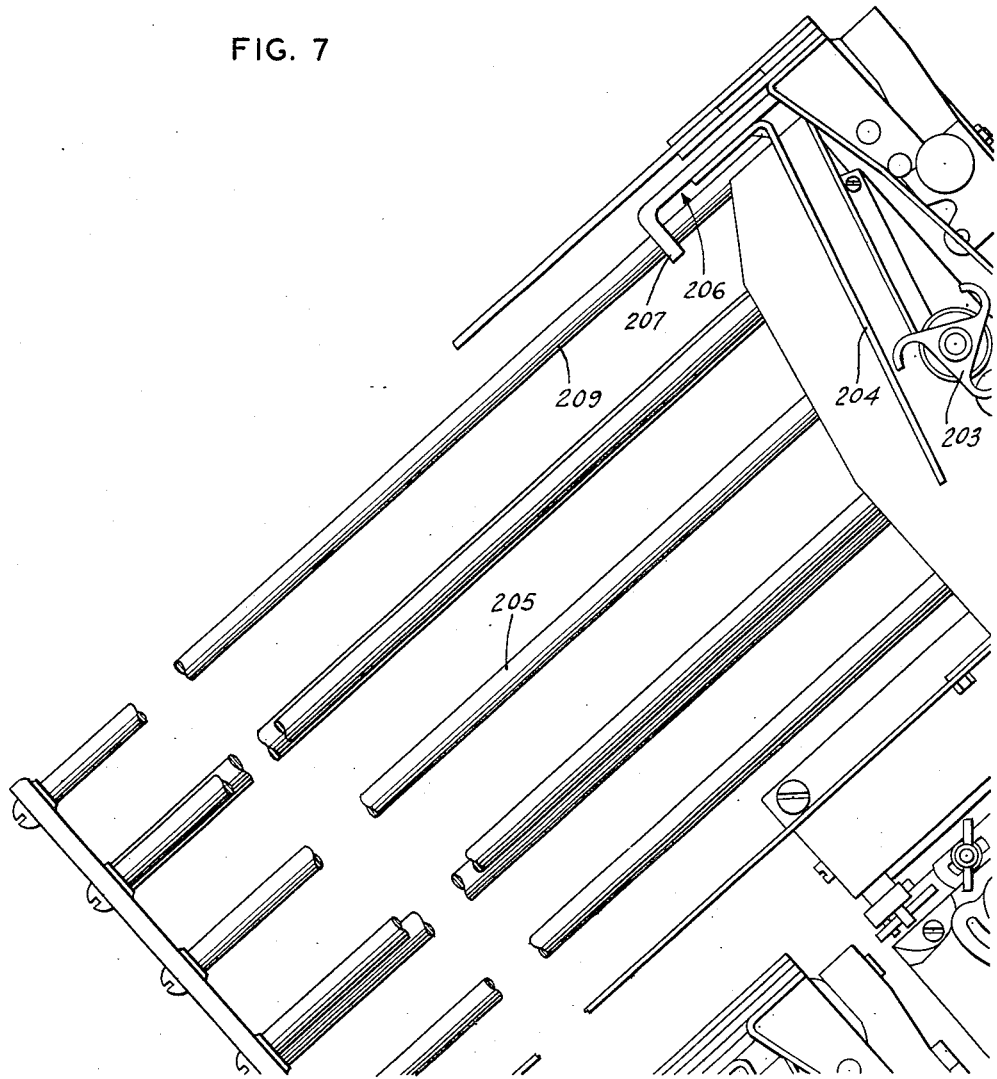
Figure 8:
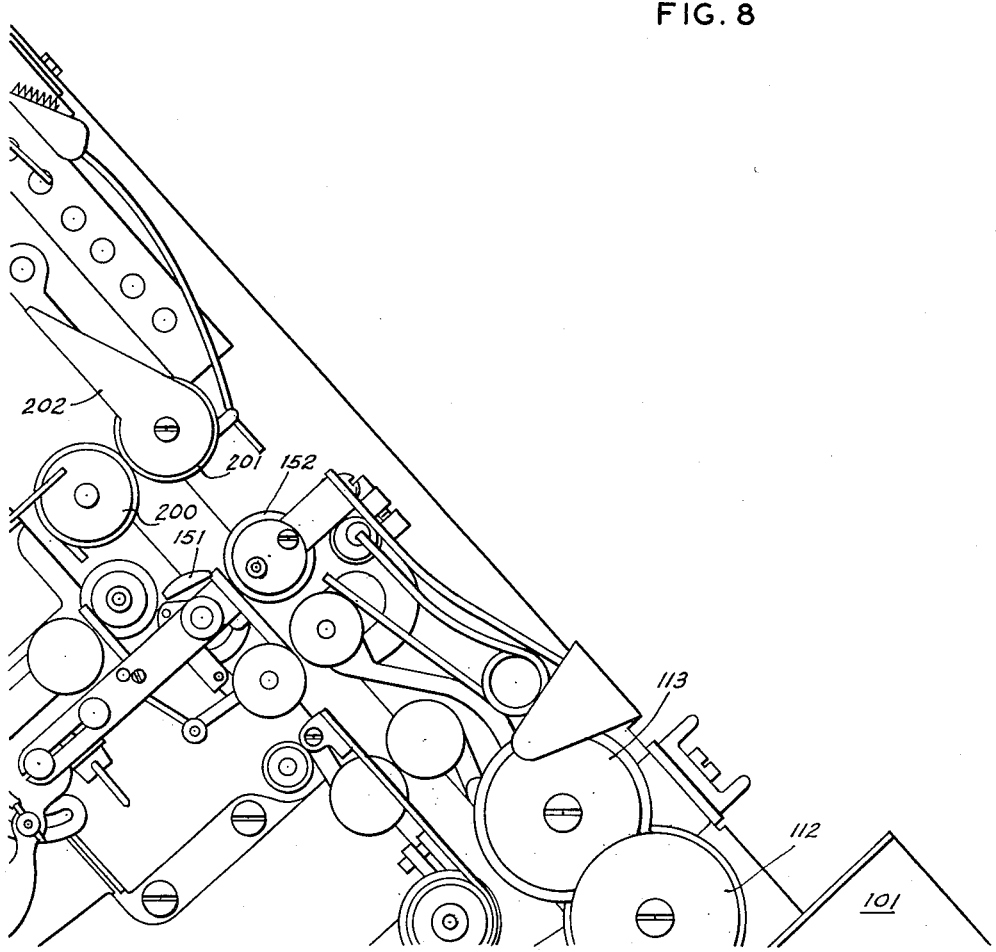

After passing between the cancelling die 151 and 152, the respective envelopes are fed into the bite of a driven rubber tired feed roller 200 and a cooperating idler roller 201. Over the latter is a portion of a fixed guard or guide member 202 which forms one side of a guideway leading to the teeth of a conventional star wheel 203. The opposite side of the guideway is the sliding member 204 or the envelopes pressed thereagainst when the machine is in operation. Due to the necessary splitting up of the drawings, the parts just referred to are best shown in Figs. 7 and 8 which show the rear cancelling and stacking unit.

As is usual, the recesses in the star wheel 203 are arranged to receive the leading edges of one envelope at a time, and with the rotation of wheel 203, the projecting arm of the next following tooth kicks the envelope outward from the star wheel. The next succeeding depression in like manner receives the leading edge of the next following envelope which is kicked outward against its predecessor by the projection forming the following tooth. With this arrangement, a basket full of envelopes is stacked up rapidly and a basket-like arrangement formed of a series of spaced horizontal rods 205 is arranged to hold the stack. The envelopes are kept resting on their edges by a sliding support plate 206 and a movable bar 204 referred to above and fixed to the sliding plate so that movement of bar 204 toward the end of the basket, as the basket fills up with envelopes, causes a corresponding displacement of sliding plate 206.

Plate 206 is formed from a rather wide strip of metal fastened at one end to a bracket. The latter is a U-shaped structure having widely spaced, relatively short arms 207 and 208, the latter not being shown as in the various figures, the bracket is partially concealed by part of the stacking apparatus. Arms 207 and 208 are perforated to slide on the outer basket bars 209. When a basket of the type described is emptied of a stack of cancelled envelopes, bar 204 is pushed back toward the star wheel to handle the next load.

The respective baskets have stop brackets displaceable manually so that each basket can be used for long or short envelopes. This structure is fully described in U. S. Patent No. 2,737,885, granted March 13, 1956, and therefore will be only briefly described here. The stop brackets of the respective stacker baskets comprise a shiftable stop bar 220 attached between two stiffening bars 221 and 222 by screws 223 to an adjustable bracket 224 which has a series of spaced perforations in its base which is adjustably positioned according to the perforations on the upper base plate of the machine. A handle 226, mounted on the bracket, is tiltably supported by means, not shown, and carries a pin, not shown, which can enter any of the perforations 225 positioned thereunder. Spring 228 holds the handle in position to lock the slide. With this arrangement, stop bar 220 and its bracket can be locked in any of a number of positions with respect to the star wheel in order to permit the stacker to be used with long or short envelopes. As the envelopes are stacked, their forward movement is stopped by thin leading edges engaging either the stop member 220 or the member 222 associated therewith. This arrangement is desirable because it is necessary for the trailing edges of all envelopes to have space enough to pass beyond the teeth of the star wheel.

The plates 100 shown in Fig. 2 of the front cancelling and stacking machine and the plate 101 shown in Figs. 5, 6 and 8 of the rear cancelling and stacking machine are standard shaped plates such as are used at present in the corresponding manually fed cancelling and stacking machines. Plate 101 of the front cancelling and stacking machine has been narrowed as well as both plates 100 and 101 of the middle cancelling and stacking machines shown in Fig. 5 and plate 100 of the rear machine also shown in Fig. 5 to permit the three machines to be positioned more closely together. This alteration of the plates does not affect the machine, or require replacement if the machines are later used for manual feed. The only other alteration in the machines is in the forward machine shown in Fig. 2 which has had the pressure arm 110 pivoted thereto. This change, however, is optional.

Figure 10:
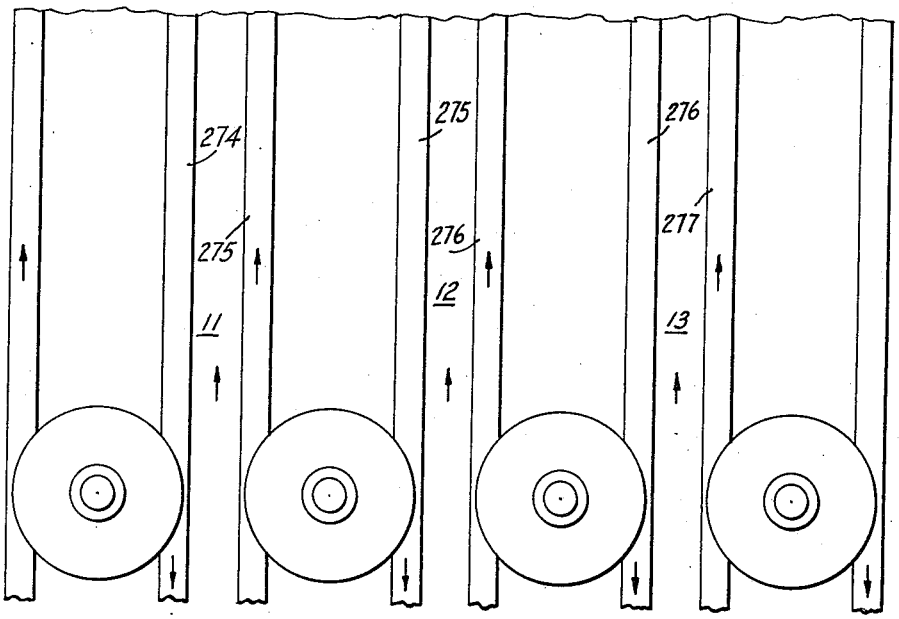
Fig. 10 is a plan view of a multiple flat belt and cooperating V-belt conveyor system for a sorting table.
Figure 13:
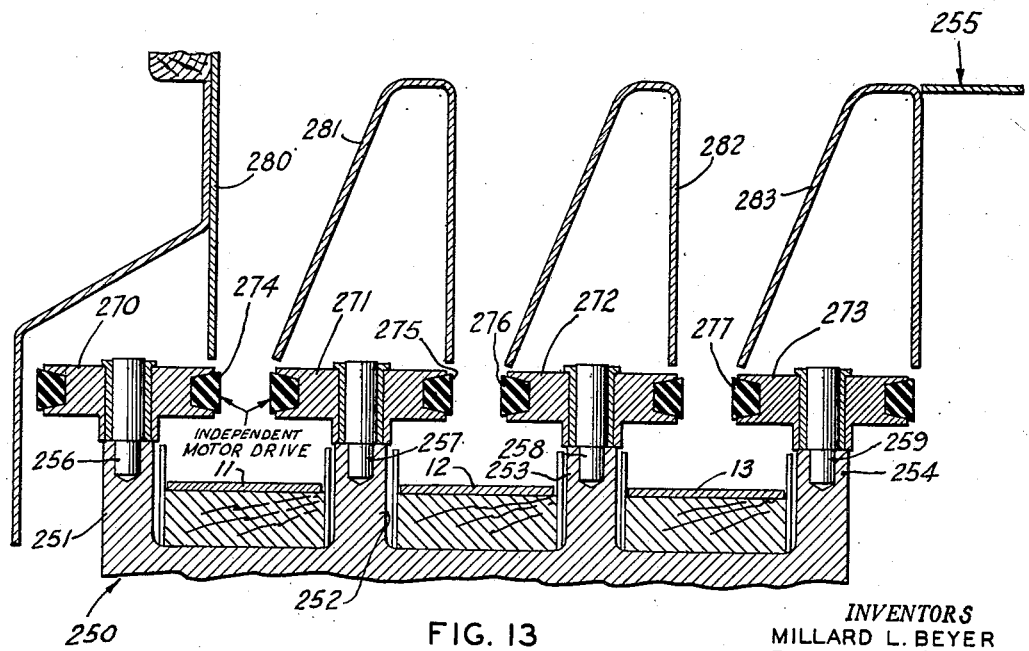
Fig. 13 is a vertical section of a sorting table showing flat conveyor belts and cooperating V-belts.

With the sorting table 10 provided with 3 flat conveyor belts 11, 12 and 13 instead of the usual two belts, it has been found that the standard belt feed of the sorting table could be run at adequate speed. However, in order to operate the three cancelling and stacking units at rates approaching their respective maximum speeds, higher speed of the flat belts of the sorting tables is necessary and such an increase in speed, together with an increased envelope load, results in jams and pileups when one large group of envelopes encounters another, resulting in the innermost envelopes of the jammed groups being pressed and expelled upward out of the trough. In order to overcome this difficulty and spread envelopes from the bunches deposited thereon uniformly over the flat conveyor belts and thus increase their carrying capacity, an arrangement including V-belts which cooperate with the flat belts of the sorting table is shown in Figs. 10 and 13. This arrangement differs from other arrangements for breaking up bunches of envelopes or spreading them out while still on the sorting table in that it contemplates driving the V-belts at a rate different from the flat conveyor belts with which they cooperate.

Referring to Fig. 13, a plate 250 formed with upright longitudinal, spaced ridges 251, 252, 253 and 254 is disposed beneath the top surface of table 255. The invention contemplates the use of three flat conveyor belts 11, 12 and 13, the innermost belt 13 being arranged similarly to belt 12 with corresponding parts for supporting the flat belt as well as the V-belts associated therewith.

The ridges 251—254 are provided with suitably spaced vertical spindles 256, 257, 258 and 259 on which the respective V-belt pulleys 270, 271, 272 and 273 turn. The V-belts 274, 275, 276 and 277 are carried by the pulleys so as to project slightly beyond the lower edges of spaced metal plates 280, 281, 282 and 283 each forming one side of a guideway for the envelopes carried by the flat belts 11, 12 and 13. Plates 280 and 281 form the guideway for the envelopes carried by belt 11 while plates 282 and 283 form the respective sides for the guideway or envelope trough overlying the mid-section of flat conveyor belt 13. Adjacent runs of the V-belts overlying respective edge portions of the flat belts are disposed so as to engage the mid-section of envelopes carried by the belts and thus provide envelope troughs with relatively narrow moving side portions which due to their relatively narrow envelope engaging surfaces exert a slight, yet appreciable amount of friction on the envelopes coming into contact therewith.

Fig. 10 shows a plan view of three flat conveyor belts 11, 12 and 13 cooperating respectively with pairs of V-belts 274—275, 275, 276 and 276—277. As indicated by the arrows, one run of the belts 275, 277 and 279 overlying the edge portions of flat belts 11, 12 and 13 run in the same direction as the flat belts to assist the flat belts in conveying envelopes toward the cancelling and stacking machines. The other runs of belts 274, 275 and 276 overlying edge portions of flat belts 11, 12 and 13 run in the opposite direction to that of the flat belts to retard and thereby spread out the envelopes or bunches of envelopes coming into contact therewith, thereby permitting faster operation of the flat belts with increased carrying capacity and avoidance of the jamming or clogging of the troughs by the engagement of bunches of envelopes. Advantageously, the V-belts move at different speeds with respect to that of the flat belts and the invention contemplates that the V-belts be driven either from separate, independent motors, such as electric motors with speed controlling devices, or by any other suitable adjustable speed drive. There are small hydraulic systems commercially available by which a number of small hydraulic motors are driven from a common pump, the respective hydraulic motors being provided with a speed control lever which regulates the flow of the fluid through the motors. Any suitable means, such as gears, pulleys and belts may be used to establish a driving connection between the respective V-belts and their motors. These mechanisms are well known and it is not thought necessary to show the driving mechanism in detail. Figs. 11 and 12 show diagrammatically variable speed individual drives for a pair of V-belts.

What is claimed is:

1. A sorting or facing table provided with a plurality of parallel spaced envelope conveying troughs extending the length of the table for handling at high speed without jamming or clogging envelopes deposited manually, singly or in bunches in the various troughs, a flat conveyor belt for each trough supported to extend beyond the end of the table, approximately upright sides for the troughs so spaced from each other as to cause the flat conveyor belts to transport envelopes riding thereon approximately upright on one of their longer edges, a V-belt for the side of each trough having runs respectively overlying the respective edge portions of each belt and projecting slightly beyond the sides of the trough and disposed to engage the outer envelopes of the respective bunches coming into contact therewith at approximately their mid-portion for the purpose of distributing more uniformly envelopes from the various bunches to avoid jamming, and independent adjustable speed drives for the respective V-belts to vary their speed with respect to each other and to the associated flat belt to obtain the optimum operation of the belts at high speed.

2. A sorting and facing table provided with individual conveying troughs extending the length of the table for short, long and air mail envelopes for transporting the envelopes toward one end of the table, a flat conveyor belt disposed at the bottom of each trough, common means disposed underneath the table for supporting the belts underneath the troughs in parallel spaced relation extending a short distance beyond the exit end of the table, upright sides for the troughs disposed over the edge portions of the belts spaced to maintain the envelopes riding on one of their edges while on the flat belt, V-belts for both sides of each trough co-extensive therewith running in opposite directions, each having a run projecting slightly beyond the trough sides disposed to exert slight friction on the mid-section of the envelopes coming into contact therewith and means for driving the V-belts adjustably at different rates to break up bunched envelopes and more uniformly distribute the envelopes on the flat belts to obtain optimum operation of the conveyor system at high speed.

3. A sorting and facing table provided with individual conveying troughs for short, long and air mail envelopes extending at least the length of the table for transporting the envelopes toward one end of the table, a flat conveyor belt disposed at the bottom of each trough, common means disposed underneath the table for supporting the belts underneath the troughs in parallel spaced relation, upright sides for the troughs disposed over the edge portions of the belts spaced to maintain the envelopes riding on one of their edges while on the flat belt, V-belts for both sides of each trough running in opposite directions, each having a run projecting slightly beyond the trough sides disposed to exert slight friction on the mid-section of the envelopes coming into contact therewith and a plurality of cancelling and stacking mechanisms, one for each trough disposed to be fed directly from the flat belts.

4. A sorting and facing table provided with individual conveying troughs for short, long and air mail envelopes for transporting the envelopes toward one end of the table, a flat conveyor belt disposed at the bottom of each trough, common means disposed underneath the table for supporting the belts underneath the troughs in parallel spaced relation, upright sides for the troughs disposed over the edge portions of the belts spaced to maintain the envelopes riding on one of their edges while on the flat belt, V-belts for both sides of each trough running in opposite directions, each having a run projecting slightly beyond the trough sides disposed to exert slight friction on the mid-section of the envelopes coming into contact therewith and a portion of each of the flat belts extending beyond the end of the table and a plurality of cancelling and stacking mechanisms arranged one behind the other fed automatically from the respective extending portions of the flat belts.

5. A sorting and facing table provided with individual conveying troughs extending the length of the table for short, long and air mail envelopes for transporting the envelopes toward one end of the table, a flat conveyor belt disposed at the bottom of each trough, common means disposed underneath the table for supporting the belts underneath the troughs in parallel spaced relation, upright sides for the troughs disposed over the edge portions of the belts spaced to maintain the envelopes riding on one of their edges while on the flat belt, V-belts for both sides of each trough co-extensive therewith running in opposite directions, each having a run projecting slightly beyond the trough sides disposed to exert slight friction on the mid-section of the envelopes coming into contact therewith, a portion of each of the flat belts extending beyond the end of the table, three independent cancelling and stacking machines disposed to alignment one behind the other at the end of the table in spaced relation and aligned therewith to provide easy access to the output baskets for the respective machines, and intermediate means for feeding the cancelling and stacking machines automatically from the extending portions of the flat belts.

6. A sorting and facing table provided with individual conveying troughs extending at least the length of the table for short, long and air mail envelopes for transporting the envelopes toward one end of the table, a flat conveyor belt disposed at the bottom of each trough, common means disposed underneath the table for supporting the belts underneath the troughs in parallel spaced relation, upright sides for the troughs disposed over the edge portions of the belts spaced to maintain the envelopes riding on one of their edges while on the flat belt, V-belts co-extensive with the flat belts for both sides of each trough running in opposite directions, each having a run projecting slightly beyond the trough sides disposed to exert slight friction on the mid-section of the envelopes coming into contact therewith, a portion of the flat belts extending beyond the end of the table, three independent cancelling and stacking machines disposed in alignment, one behind the other at the end of the table in spaced relation therewith, and intermediate means disposed between the extending portions of the belts and the cancelling and stacking machines comprising three independently driven envelope conveying channels, one for each flat conveyor belt arranged in diverging relationship for connecting the flat conveyor belts of the table with the inputs of corresponding ones of the cancelling and stacking units.

7. An automatic envelope cancelling and stacking mechanism adapted to be assembled at will by the use of an adaptor unit from mechanisms which are normally non-automatic, the adaptor unit comprising a plurality of envelope conveyor channels having envelope conveying means therein including rollers and belts, the latter corresponding in length to that of the respective channels, the channels being arranged so that their outputs are more widely spaced from each other than the inputs and positioned one behind the other in substantial alignment by constructing the channels with progressively increasing length and by spreading the channels out from each other just beyond their inputs, other units which may be normally operated manually including a facing and sorting table provided with a plurality of flat parallel conveyor belts spaced from each other adjacent one edge of the table and a plurality of cancelling and stacking machines arranged close to each other with the machines as well as their output baskets arranged in spaced relation with respect to the sorting table beyond the end of the table with the adaptor unit positioned therebetween, the inputs of the adaptor unit being spaced according to that of the flat conveyor belts and positioned to receive respectively envelopes fed therefrom and outputs of the adaptor conveyor channels being more widely spaced corresponding to the greater spacing of the inputs of the cancelling and stacking units, the latter units being positioned so that each of them receives directly envelopes fed from a corresponding one of the adaptor unit channels.

8. An automatic envelope cancelling and stacking mechanism adapted to be assembled and dismounted at will with no substantial change in the parts involved or their individual normal operation by the use of an independent adaptor unit, self driven and comprising a plurality of envelope conveyor channels, independent supporting means to which the channels are assembled, the channels being constructed with aligned inputs uniformly spaced from each other and outputs from which the envelopes from the respective channels are expelled arranged one behind the other disposed in substantial alignment with each other from front to rear but having greater spacing than the inputs, other units which may be normally operated manually including a facing and sorting table provided with a plurality of flat parallel conveyor belts spaced from each other adjacent one edge of the table and a plurality of cancelling and stacking machines arranged close to each other with the machines as well as their output baskets arranged in spaced relation with respect to the sorting table beyond the end of the table with the adaptor unit positioned therebetween, the inputs of the adaptor unit being spaced according to that of the flat conveyor belts and positioned to receive respectively envelopes fed therefrom and outputs of the adaptor conveyor channels being more widely spaced corresponding to the greater spacing of the inputs of the cancelling and stacking units, the latter units being positioned so that each of them receives directly envelopes fed from a corresponding one of the adaptor unit channels.

9. An automatic envelope cancelling and stacking machine adapted to be assembled from independent units and disassembled at will without affecting the operation of the individual units involved by the use of an independent adaptor unit independently driven and detachably supported by at least one of the other units which cooperates therewith, said adaptor unit comprises a plurality of diverging envelope conveying channels, independent supporting means by which the channels are attached to at least one of said other units, the other units which may be normally operated manually including a facing and sorting table provided with a plurality of flat parallel conveyor belts spaced from each other adjacent one edge of the table and a plurality of cancelled and stacking machines arranged close to each other with the machines as well as their output baskets arranged in spaced relation with respect to the sorting table beyond the end of the table with the adaptor unit positioned therebetween, the inputs of the adaptor unit being spaced according to that of the flat conveyor belts and positioned to receive respectively envelopes fed therefrom and outputs of the adaptor conveyor channels being more widely spaced corresponding to the greater spacing of the inputs of the cancelling and stacking units, the latter units being positioned so that each of them receives directly envelopes fed from a corresponding one of the adaptor unit channels.

10. An automatic envelope cancelling and stacking mechanism assembled from a number of discrete units comprising a plurality of stacking and cancelling units placed side by side close to each other with their output baskets disposed side by side in parallel relation and their inputs, when viewed from front to rear also arranged side by side in generally parallel relation, a sorting and facing table including a plurality of flat parallel belts having outputs arranged more closely than the inputs of the cancelling and stacking units, an adaptor unit comprising a plurality of envelope conveying channels disposed in diverging relation, the spacing of the inputs of the channels of the adaptor unit corresponding to that of the flat conveyor belts and when in use disposed so that the reflective channels are positioned to be fed respectively directly by the flat conveyor belts, the outputs of the channels diverging from each other to correspond to the greater spacing of the inputs of the cancelling and stacking units and are positioned so that the respective channels feed envelopes into the input of a corresponding cancelling and stacking unit.

11. An apparatus for feeding envelopes comprising a sorting and facing table having a plurality of flat parallel conveyor belts having outputs disposed just beyond one end of the table, a group of closely spaced independently operable cancelling and stacking machines which are normally manually fed, means for feeding the respective machines from individual ones of the belts which comprises an adaptor unit provided with a plurality of independent envelope conveyor channels, one for each machine, of different length and flaring away from each other, the inputs of said unit being spaced to correspond to the spacing of the flat conveyor belts and positioned when in use to receive envelopes directly therefrom, the channels being relatively disposed to space their outputs to match up with the inputs of the respective cancelling and stacking machines which is greater than that of the spacing between the outputs of the flat conveyor belts of the table in order to feed envelopes directly from the respective channels into the inputs of the corresponding cancelling and stacking machine.

12. An apparatus as a group for assembling for automatic feeding a series of post office cancelling and stacking machines, the machines being relatively so positioned that the baskets for the stacked envelopes of the respective machines are arranged side by side in generally parallel position which comprises an adaptor unit for coupling the exits of a plurality of parallel pick-up table channels which extend in parallel relation for the length and slightly beyond the end of the pick-up table in register with the corresponding inputs of independent adaptor channels, the latter channels being positioned to diverge considerably from their inputs toward their outputs to provide outputs widely spaced to correspond with the necessarily widely spaced machine inputs each of which has a space for inserting a bunch of envelopes during manual feeding.

13. An apparatus according to claim 12 in which the respective pick up table belts are supported on horizontal roller means adapted to extend underneath the adaptor unit channels associated therewith to simplify the adaptor unit mechanism by eliminating the need for additional flat belts in the respective adaptor unit channels.

14. An apparatus according to claim 13 having belts that turn on pulleys mounted on vertical axes which engage at least one side of the envelopes passing along any given adaptor channel to furnish propulsion therefor before any envelope or group of envelopes has lost the velocity imparted thereto by the particular flat belt of the pick up table that has just been associated therewith.

15. An apparatus according to claim 14 in which at least one of the top flat guide plates, adjacent the belt thereof is replaced by a similar plate, similarly used but which is slightly reshaped to provide a better appearing top view of the machines when assembled in a group of three.

16. An apparatus for assembling as a group for automaitc feeding a series of post office units used for cancelling and stacking envelopes manually fed thereto which comprises an independent adaptor feeding channel assembled as a unit, one for each machine, the channels being arranged in flaring relation in the same plane having more widely spaced exit ends of the channels arranged so that the exit portion of each channel feeds directly into the input of a corresponding flyer while the entrance portion of the adaptor channels are spaced and arranged to receive envelopes fed thereto directly from individual ones of a series of parallel spaced troughs having conveying belts arranged along one side of the entire length of a pick-up table.

17. An apparatus for assembling as a group, three independent post office machines for automatic feeding said machines being well known as hand fed automatic individual units for stacking and cancelling envelopes fed thereto which comprises an integral group of three independent channels having separate envelope feeding mechanisms including three channels with their outputs so spaced as to respectively feed envelopes from their exits into corresponding inputs of one of the three machines arranged in a group, the entrance channels being more closely spaced to receive directly from respective individual channels from a pick-up table having three closely spaced channels running in parallel relation alongside one edge of the pick up table for substantially the entire length of the table.

References Cited in the file of this patent
UNITED STATES PATENTS

| 1,054,223 | Lynch | Feb. 25, 1913 |
| 1,060,943 | Rehack | May 6, 1913 |
| 1,072,388 | Madigan | Sept. 2, 1913 |
| 1,214,243 | Walker | Jan. 30, 1917 |
| 1,217,092 | Hopp | Feb. 20, 1917 |
| 1,333,006 | Welser | Mar. 9, 1920 |
| 1,703,148 | Selfield | Feb. 16, 1929 |
| 2,070,822 | Beardsley | Feb. 16, 1937 |
| 2,090,697 | Needham | Aug. 24, 1937 |
| 2,316,654 | Stover | Apr. 13, 1943 |